United States Patent [19]

Kong

[11] Patent Number: 5,477,553
[45] Date of Patent: Dec. 19, 1995

[54] COMPRESSED MEMORY ADDRESS PARITY CHECKING APPARATUS AND METHOD

[75] Inventor: Edmund Y. Kong, Fremont, Calif.

[73] Assignee: Professional Computer Systems, Inc., Milpitas, Calif.

[21] Appl. No.: 279,484

[22] Filed: Jul. 22, 1994

[51] Int. Cl.$^6$ ................................................ G06F 11/10
[52] U.S. Cl. ............................................................ 371/51.1
[58] Field of Search ................................... 371/51.1, 40.1

[56] References Cited

U.S. PATENT DOCUMENTS

| | | | |
|---|---|---|---|
| 3,789,204 | 1/1974 | Barlow | 371/51.1 |
| 3,963,908 | 6/1976 | Das | 371/51.1 |
| 4,483,003 | 11/1984 | Beal | 371/51.1 |
| 4,959,835 | 9/1990 | Yosida et al. | 371/51.1 |
| 5,345,582 | 9/1994 | Tsuchiya | 395/575 |
| 5,367,526 | 11/1994 | Kong | 371/51.1 |

*Primary Examiner*—Stephen M. Baker
*Attorney, Agent, or Firm*—Fliesler, Dubb, Meyer & Lovejoy

[57] ABSTRACT

A compressed memory address parity (CMAP) checking apparatus for checking the parity of data read from a data memory comprising a low capacity auxiliary memory with $2^N$ address spaces and an adaptive auxiliary memory addressing scheme to reduce the amount of memory required to perform parity checking. When data is stored in the data memory at an address MA having M bits, (M–N) bits of the data memory address together with one or more parity bits generated from the data stored in the data memory is stored in the auxiliary memory at an address given by the remaining N bits of the data memory address. When data is read from an address MA in the data memory, the (M–N) bits at the address N in the auxiliary memory is compared with the corresponding (M–N) bits in the data memory address. If there is a match, the one or more parity bits stored in the auxiliary memory are read. If there is no match, the one or more parity bits generated from the data read from the data memory are used and the data and one or more parity bits in the auxiliary memory are updated, the data comprising the most recently used M bits of the data memory address.

17 Claims, 8 Drawing Sheets

COMPRESSED MEMORY ADDRESS PARITY CHECKING APPARATUS AND METHOD

BACKGROUND OF THE INVENTION

1. Field of the Invention

The present invention relates to parity checking apparatus in general and in particular to parity checking apparatus which uses an auxiliary memory and an adaptive auxiliary memory addressing scheme to reduce the amount of memory required to perform parity checking.

2. Description of the Related Art

The advent of personal computers ushered in by Apple Computer, IBM and other manufacturers has created a very large demand for memory chips in computers. With the introduction of Microsoft operating systems like Windows and Windows NT, the demand for memory capacity jumped from 1 megabyte to 4 megabytes for Windows applications, and to 8 or 16 megabytes for Windows NT applications. In the near future, a memory capacity of 32, 64 or even 256 megabytes is expected to be required for the more sophisticated operating systems.

To ensure the integrity of the data in a memory, one extra bit is added for each byte or 8 bits of data for parity checking. For a 32 bit data memory system, 4 more memory cells in addition to the 32 data memory cells are used to ensure 32 bit data memory integrity.

When each byte of data is written into the memory, a parity bit generator of the memory controller generates an odd or even parity bit. The choice of using odd or even parity is decided initially by the design engineer or subsequently by a user selectable jumper on the system board. Each generated parity bit corresponding to a byte of memory data is stored in an extra memory chip with a full address directly corresponding to the location of each byte of data in the memory chips. When each byte of data is read from the data memory, each corresponding parity bit is retrieved from the parity memory chip and is sent to a first input of a parity bit checker. In the meantime, the same parity bit generator in the same memory controller generates another new parity bit according to the incoming memory data. This newly generated parity bit is sent to a second input of the parity checker. The parity checker compares the retrieved parity bit with the newly generated parity bit. If the two bits match, the memory data is good. If the two bits do not match, the memory data is considered to be corrupted and a memory parity check is issued. The occurrence of a memory parity check causes the non-maskable interrupt (NMI) to halt the operation of the central processing unit (CPU). It is up to the user to either reset and restart the computer or have the computer repaired.

The additional memory chips for storing and retrieving the parity bits contributes approximately 11% to the cost of a memory. This seems to be trivial when memory capacity is at 1 megabyte. However, when memory capacity increases to 4 megabytes, 16 megabytes, 64 megabytes or 256 megabytes, the additional memory parity overhead cost can be extremely high. The following is a comparision of the cost of memory parity chips at present:

| Memory chip of 1 megabyte by 1 | $ 5 |
| Memory chip of 4 megabytes by 1 | $ 16 |
| Memory chip of 16 megabytes by 1 | $ 64 |
| Memory chip of 64 megabytes by 1 | $ 300 |
| Memory chip of 256 megabytes by 1 | $1200 (estimate) |

From the foregoing list it can be seen that the additional memory parity overhead cost is considerable for memory capacities of 4 megabytes or more and becomes a very significant estimated $1200 per system when a 256 megabyte capacity is required. As a matter of fact, memory parity overhead cost can be four times more expensive for a computer with a 32 bit data bus like the Intel 486, and eight times more expensive for a computer with a 64 bit data bus like the Intel Pentium. This is because every 8 bits of memory data requires 1 additional memory cell for parity bit storage and retrieval. Thus a 32 bit system requires 4 additional memory cells, and a 64 bit system requires 8 additional memory cells.

This tremendous memory parity overhead cost for memory data integrity checking becomes extremely expensive especially when personal computers are becoming more like household commodity items. Since the volume of computer sales is estimated at 49 million units per year, and each computer is equipped with mostly 4 megabyte to 16 megabyte memories, the memory parity overhead cost is 49 million·(16+64)/2=$1.96 billion per year.

In view of the above-described memory parity overhead cost in some computer systems like the Apple Macintosh, the memory parity chips are eliminated completely in order to provide a cost saving. This can be very bad or even disastrous if the computer system is not able to check the memory data integrity during its operations. This is an even more serious problem when computers are used in business and industrial applications where large capacity memories are required, and detection of a memory failure is of the utmost importance for safe computer operation.

Therefore, there is a need for an improved low cost approach or alternative for the present memory parity checking system.

SUMMARY OF THE INVENTION

In view of the foregoing, a principal object of the present invention is a low cost apparatus called a compressed memory address parity (CMAP) apparatus, which can be used to replace present day expensive memory parity components for memory data integrity checking in personal computer systems, in a semiconductor hard disk, and in single inline memory module (SIMM) and double density inline memory module (DIMM) memory modules comprising various numbers of input/output pins.

The apparatus of the present invention uses a compression method which compresses large memory address space into smaller address space so that relatively smaller address space storage devices such as an array of flip-flops with a tristate output, a static ram (SRAM), dynamic ram (DRAM), EE Prom or Flash Ram can be used and integrated with fewer logic gates to perform the memory parity checking.

The novel approach of storing and retrieving parity bits using devices having a relatively small memory capacity and fewer logic gates contributes to a very small increase in the memory parity overhead cost, component space and integrated circuit power consumption presently used. To compress large memory address space into relatively smaller memory address space, combinatorial and comparison logic are used.

The CMAP apparatus of the present invention is capable of performing memory data integrity checking for 8, 16, 24, and 32 bit systems and is upgradable to 64 bits and even 128 bits by using additional integrated logic gates. In practice, there is no limit in its application to computer systems with different word lengths. There is also no limit in its application to different parity bit structures, such as the one used in SUN workstations where one memory parity bit exists for every 32 bit memory data word.

Because of its fewer logic gates and fewer memory cells, the CMAP apparatus of the present invention is a low cost integrated logic apparatus which can replace expensive memory parity components and can help save billions of dollars in imported memory cost.

BRIEF DESCRIPTION OF THE DRAWINGS

The above and other objects, features and advantages of the present invention will become apparent from the following detailed description of the accompanying drawings, in which.

DETAILED DESCRIPTION OF THE INVENTION

FIGS. 1–11 provide illustrations of the invention disclosed herein. In these figures, like components are designated by like numerals.

Figure 1:
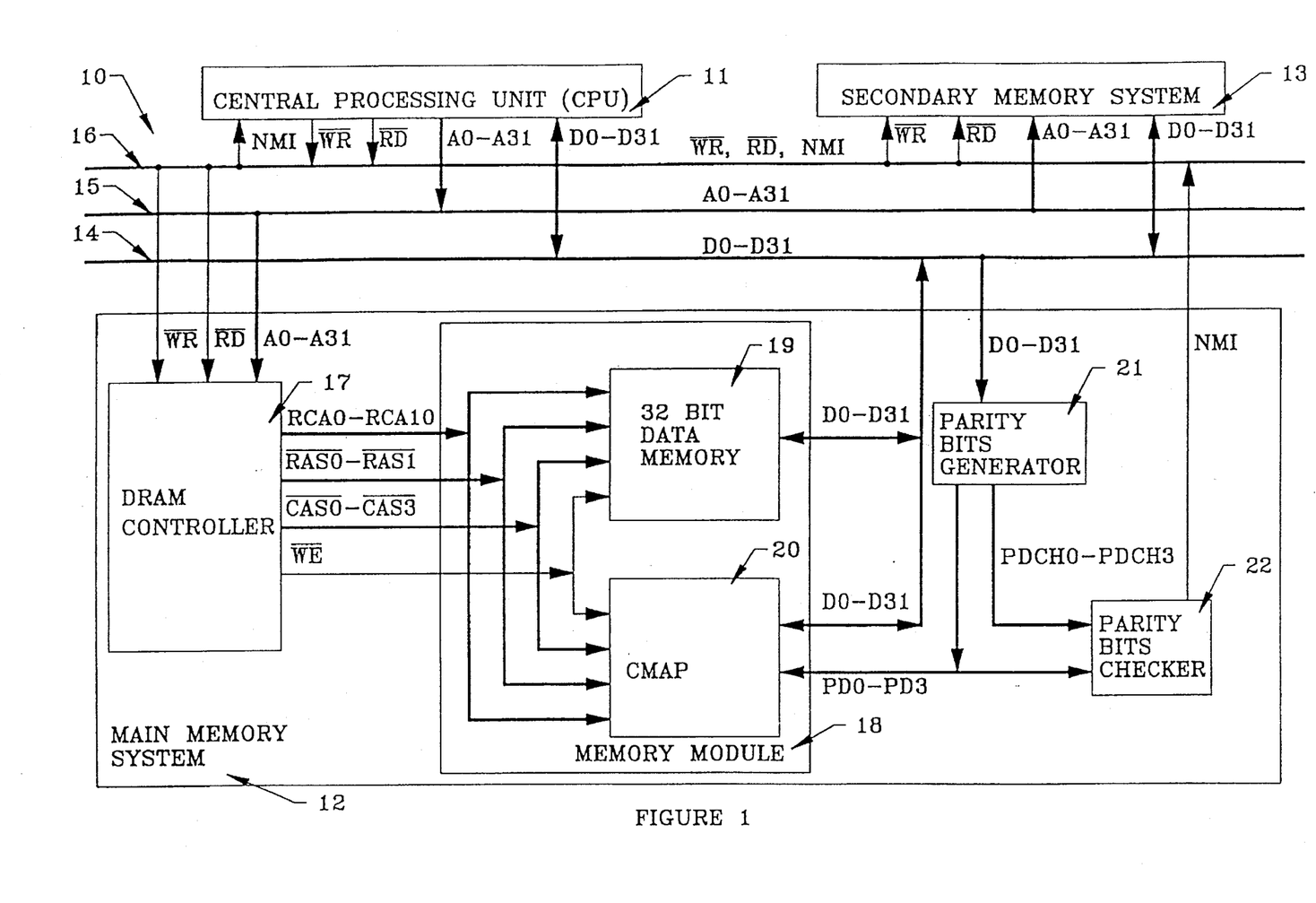
FIG. 1 is a block diagram of a computer system with a memory storage/retrieval system for a 32 bit data word, and a 32 bit CMAP apparatus in accordance with the invention.

Referring to FIG. 1, there is shown a block diagram of a computer system 10. The computer system 10 includes a central processing unit (CPU) 11, a main memory system 12, a secondary memory system 13, a 32 bit bidirectional data bus 14, an address bus 15, and a control bus 16.

In the main memory system 12 there is provided a dynamic-random-access memory (DRAM) controller 17, a memory module 18, a parity bits generator 21 and a parity bits checker 22. In the memory module 18 there is provided a 4 megabyte 32 bit DRAM 19 and a 32 bit compressed memory address parity (CMAP) apparatus 20 in accordance with the present invention.

During a memory write cycle, a 32 bit data word is stored in the data memory 19 of the memory module 18. At the beginning of the write cycle, the CPU 11 generates a write signal ($\overline{WR}$) and a 32 bit address (A0–A31). The write signal ($\overline{WR}$) is-outputted on the control bus 16 while the address (A0–A31) is outputted on the address bus 15.

In response to the received write signal ($\overline{WR}$) and the address (A0–A31), the DRAM controller 17 of the main memory system 12 generates a set of write cycle control signals and address signals. These signals are necessary to store the 32 bit data word in the memory module 18.

The control signals include a write enable signal ($\overline{WE}$), two row address strobes ($\overline{RAS0}$, $\overline{RAS1}$), four column address strobes ($\overline{CAS0}$–$\overline{CAS3}$) for memory read/write and memory parity operations. Each of these signals is provided to the 32 bit DRAM19 and the CMAP apparatus 20.

For a 4 megabyte memory system, there are provided 11 bit RAS/CAS addresses (RCA0–RCA10) from DRAM controller 17. These addresses are multiplexed to the 32 bit DRAM memory 19 and to the CMAP apparatus 20 by first applying row address strobes ($\overline{RAS0}$, $\overline{RAS1}$), and then column address strobes ($\overline{CAS0}$–$\overline{CAS3}$).

During a memory write operation, in response to the received data word (D0–D31), the parity bits generator 21 of the main memory system 12 generates four parity data bits (PD0–PD3) corresponding to the four groups of data (D0–D7), (D8–D15), (D16–D23) and (D24–D31) respectively. These four parity data bits (PD0–PD3) are then provided to the CMAP apparatus 20 and stored according to the respective address locations.

During a memory read operation, the 32 bit data word (D0–D31) is retrieved from DRAM memory 19 and the original parity data bits (PD0–PD3) are retrieved from the CMAP apparatus 20 of the memory module 18. In the meantime, the parity bits generator 21 of the main memory system 12 generates four more newly created parity check bits (PDCH0–PDCH3) according to the retrieved 32 bit data word. These four newly created parity check bits (PDCH0–PDCH3) are then compared with the four retrieved parity bits (PD0–PD3) from CMAP 20 in the parity bits checker 22. If a discrepency occurs between any one of the four parity bits, a memory parity check is issued and causes a non-maskable interrupt (NMI) on the control bus 16. This will cause the CPU to halt the system operation. The user will have to reset and restart the computer, or have it repaired.

Figure 2:
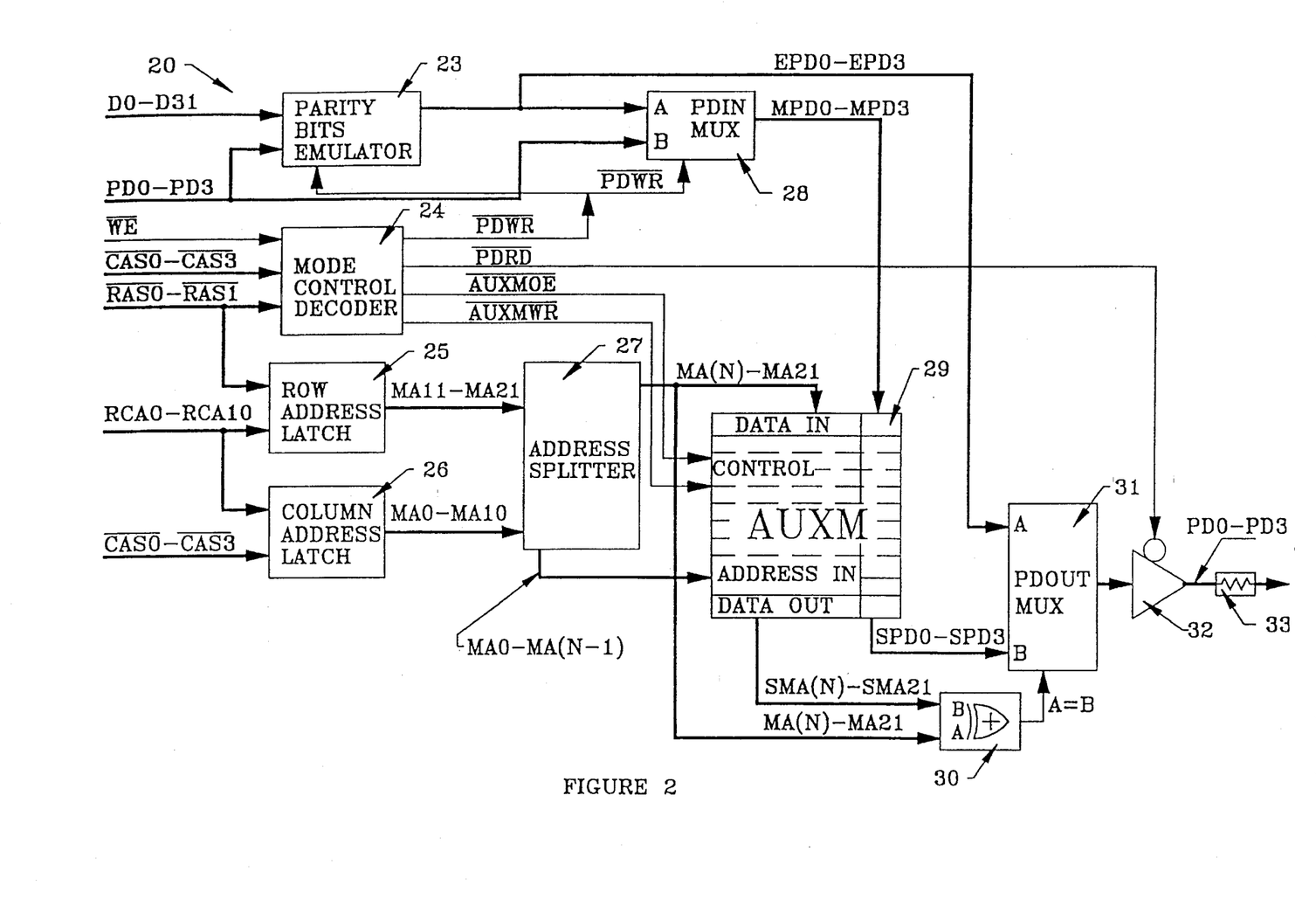
FIG. 2 is a detailed block diagram of the 32 bit CMAP apparatus of FIG. 1, which is capable of performing 8 to 32 bit memory data integrity checking by storing and retrieving one to four parity data bits corresponding to the incoming memory address.

Referring to FIG. 2, there is shown a detailed block diagram of the CMAP apparatus 20 having an auxiliary memory 29, which is capable of working with an 8 bit, 16 bit, 24 bit and a 32 bit data memory for parity checking. Memory 29 is preferably an array of flip-flops with a tristate output, but may also comprise an SRAM, a DRAM, an EEPROM, a FLASH RAM or the like.

During a memory data write operation, the CPU 11 with its DRAM controller 17 sends the memory operation signals: two row address strobes ($\overline{RAS0}$, $\overline{RAS1}$), four column address strobes ($\overline{CAS0}$–$\overline{CAS3}$), and a write enable ($\overline{WE}$) to the mode control decoder 24, which produces parity data write ($\overline{PDWR}$), parity data read ($\overline{PDRD}$), AUXM write ($\overline{AUXMWR}$), and AUXM output enable ($\overline{AUXMOE}$) commands.

The eleven bit multiplexed RAS/CAS address (RCA0–RCA10) is initially latched in row address latch 25 by RAS address strobes ($\overline{RAS0}$, $\overline{RAS1}$) to form a row address and output as the high memory address (MA11–MA21). Thereafter, the RAS/CAS address (RCA0–RCA10) is latched in column address latch 26 by column address strobes ($\overline{CAS0}$–$\overline{CAS3}$) to form a column address and output as the low memory address (MA0–MA10).

The 22 bit memory address (MA0–MA21) is then split up with a memory address compression ratio of "N" in address splitter 27. The memory address compression ratio "N" is accomplished by connecting a number N of memory address lines (MA0–MA(N–1)) to the address input of the AUXM 29; and connecting the remaining number 22–N number of memory address lines (MA(N)–MA21) to the data input of the AUXM 29.

If the memory address compression ratio N is chosen to be equal to 22, there will be N=22 memory address inputs to the AUXM 29, but 22–N=0 data inputs to the AUXM 29. This extreme configuration will make the AUXM 29 look like the normal full address memory chip with $2^{22}$ memory address inputs.

Another extreme case is address compression ratio N=0. This means that there will be N=0 address input to the AUXM 29, indicating that zero address space is required for parity storage/retrieval. Zero address space means AUXM 29 is taken out from the circuit. Hence all the parity bits will come from the parity bits emulator 23 only. The choice of address compression ratio N=0 is implemented in apparatus described in applicant's copending patent application, entitled Memory Module, Parity Bit Emulator, Associated Method For Parity Bit Emulation, Ser. No. 08/080,699, filed Jun. 22, 1993, the contents of which are incorporated herein by reference.

By choosing N=6, there will be 6 memory address lines (MA0–MA5) to the address input of the AUXM 29. There will be 22–N=16 memory address lines (MA(6)–MA21) to the data input of the AUXM 29. This makes the AUXM 29 become a $2^6$=64 address·16 bit data which is an equivalent of a 1K memory storage device. By choosing the memory address compression ratio from N=0 to 22, a large four megabyte address memory space device is compressed into a smaller address memory space ($2^N$) device. Thus the smaller the address compression ratio N, the smaller the address space required to be provided by AUXM 29 to accomplish the memory parity storage and retrieval for parity checking. However, if the address space in AUXM 29 is too small, the address compression ratio N will result in frequent mismatches of the 22–N bit address comparator 30, thus making the memory parity checking inefficient, as will be further described in detail below.

At the same time that the AUXM 29 is being addressed as described above, the 32 bit bidirectional data (D0–D31) and 4 bit bidirectional parity data (PD0–PD3) are inputted into the parity bits emulator 23. Inside the parity bits emulator 23, as described in the above-identified U.S. patent application, there are four parity bit generators which generate both odd and even parity bits for each group of eight bits of incoming data (D0–D7, D8–D15, D16–D23, D24–D31). The four incoming parity data bits (PD0–PD3) are compared with the four generated odd and even parity bits to determine which parity format (odd or even) is used in the memory parity checking scheme. Once the parity format is determined, the parity format is captured and stored inside a register flag of the parity bits emulator 23. For any subsequent memory read operation, parity bits emulator 23 always and automatically generates and returns the right formatted parity bits (odd or even) corresponding to each incoming group of data (D0–D7, D8–D15, D16–D23, D24–D31). Since the parity bits emulator 23 has no storage memory cells, all of the four output parity bits (EPD0–EPD3) are always generated instead of retrieved, with always the right format.

For a memory write operation, parity input multiplexer (PDINMUX) 28 always selects the incoming group of four parity data bits (PD0–PD3). For a memory read operation, parity input multiplexer (PDINMUX) 28 always selects the four emulated parity bits (EPD0–EPD3) from the parity bits emulator 23.

When 32 bit data word (D0–D31) and four parity data bits (PD0–PD3) are inputted with the corresponding eleven bit multiplexed RAS/CAS address (RCA0–RCA10), the row address latch 25 latches the 11 bit address (RCA0–RCA10) to form a row address and output as high memory address (MA11–MA21). The column address latch 26 latches the 11 bit address (RCA0–RCA10) to form a column address and output as low memory address (MA0–MA10). All of the twenty two memory addresses (MA0–MA21) go to the address splitter 27. By choosing the memory address compression ratio N, N memory addresses (MA0–MA(N–1)) go to the address input of the AUXM 29, and 22–N number of memory addresses (MA(N)–MA21) go to the data input of the AUXM 29.

For a memory write operation, the parity input multiplexer (PDINMUX) 28 always selects the group of incoming parity data bits (PD0–PD3) and outputs as memory parity data bits (MPD0–MPD3) to the data input of the AUXM 29. As soon as the mode control decoder 24 outputs the AUXM write ($\overline{AUXMWR}$) signal to the AUXM 29, the 22–N latched memory address bits (MA(N)–MA(21)) and four memory parity data bits (MPD0–MPD3) will be stored in the AUXM 29 with the corresponding N pointing memory address bits (MA0–MA(N–1)).

During a subsequent memory read operation, the AUXM 29 receives the AUXM output enable ($\overline{AUXMOE}$) from the mode control decoder 24. The memory address (MA0–MA(N–1)) pointing to the AUXM 29 will output the corresponding stored memory address (SMA(N)–SMA21) data to the input of the 22–N bits address comparator 30. The latched incoming memory address bits (MA(N)–MA21) are always connected to the other input of the address comparator 30. If the comparison of both the stored memory address (SMA(N)–SMA21) and the latched incoming memory address (MA(N)–MA21) is the same, the output of the address comparator 30 will output the A=B active true signal to the parity out multiplexer (PDOUTMUX) 31 which will then select the stored parity bits (SPD0–SPD3) from the AUXM 29. If the address comparison is not the same, the parity out multiplexer (PDOUTMUX) 31 will select the emulated parity data bits (EPD0–EPD3) from the parity bits emulator 23.

A tristate output buffer 32 enabled by parity data read signal ($\overline{PDRD}$) from mode control decoder 24 is used to output the bidirectional parity data bits (PD0–PD3) back to the input of the parity bits checker 22 of the computer system 10 (in FIG. 1). In the meantime, with the received 32 bit memory data (D0–D31), parity bits generator 21 outputs four parity data check bits (PDCH0–PDCH3) to the other input of parity bits checker 22. Parity bits checker 22 will then compare the newly generated parity data check bits (PDCH0–PDCH3) with the retrieved memory parity bits from the CMAP apparatus 20 to ensure memory data integrity.

To ensure that the AUXM 29 is used efficiently so that parity bits are read more often from the stored memory locations AUXM 29 rather than from the emulated parity bits emulator 23, a most recently read modified write algorithm is performed to the AUXM 29 each time there is a mismatch in the comparator 30. Thus if a present read operation results in a mismatch from the 22–N bit address comparator 30, the parity data out multiplexer (PDOUTMUX) 31 will select the emulated parity data bits (EPD0–EPD3) from parity bits emulator 23 and output as parity data (PD0–PD3) to the computer system. In the meantime, the multiplexer (PDINMUX) 28 selects the emulated parity bits (EPD0–EPD3) and outputs as memory parity data (MPD0–MPD3) to the input of the AUXM 29. A read modified write operation to the AUXM 29 will then immediately store the emulated parity data bits (EPD0–EPD3) and the most recently read memory address (MA(N)–MA21) to the data input of AUXM 29 with memory locations corresponding to the most recently read memory address pointer (MA0–MA(N−1)). Statistically, the next or near future read operations will have more favorable matching conditions than prior known algorithms because program instructions tend to cluster locally in small loops. This will result in more comparision matches in address comparator 30. The parity out multiplexer (PDOUTMUX) 31 will select more stored parity data bits (SPD0–SPD3) from the AUXM 29 than emulated parity bits (EPD0–EPD3) from parity bits emulator 23. Finally, the selected parity data bits (PD0–PD3) will be outputted from a tristate buffer 32 enabled by parity data read signal ($\overline{PDRD}$). Parity Data (PD0–PD3) will go through four terminating resistors (typical 100–200 ohm) 33. These terminating resistors act as filters to isolate address interference from CPU operation during memory hidden refresh cycles. This most recently read modified write operation ensures that the address comparator 30 is always comparing the most recently read memory addresses to achieve a 90% or more matching ratio.

Figure 3:
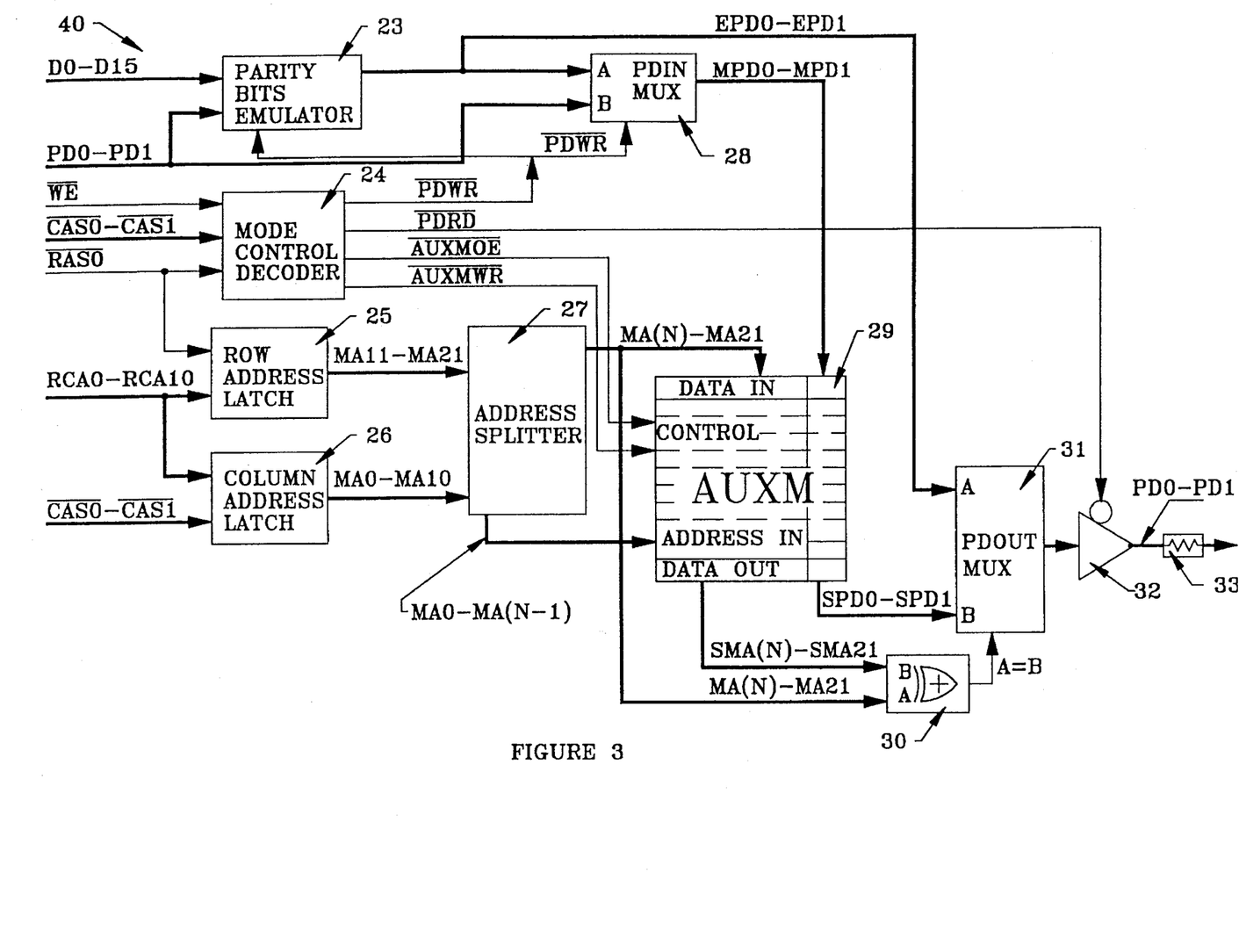
FIG. 3 is a detailed block diagram of a 16 bit CMAP apparatus according to the present invention, which is capable of performing 16 bit memory data integrity checking by storing and retrieving two parity data bits corresponding to the incoming memory address.

FIG. 3 shows a 16 bit version of a CMAP apparatus 40 according to the present invention, wherein sixteen data bits (D0–D7, D8–D15) and two parity data bits (PD0–PD1) are inputted to the parity bits emulator 23. One RAS ($\overline{RAS0}$), two ($\overline{CAS0}$, $\overline{CAS1}$) and an 11 bit RAS/CAS multiplexed address (RCA0–RCA10) signals are inputted to row and column address latches 25, 26. The operation of the CMAP apparatus 40 is identical to the 32 bit CMAP 20 in FIG. 2, except only two parity data bits (PD0–PD1) corresponding to each incoming memory address is stored in the AUXM 29. Address comparator 30 compares both stored memory address (SMA(N)–SMA21) and latched memory address (MA(N)–MA21) to determine if a match has occured. If a match occurs, the parity data output multiplexer (PDOUTMUX) 31 selects the two stored parity data (SPD0–SPD1) from AUXM 29, otherwise it selects the two emulated parity data bits (EPD0–EPD1) from parity bits emulator 23. Finally, tristate buffer 32 enabled by parity data read ($\overline{PDRD}$) signal will output the two selected parity data bits (PD0–PD1). Parity data bits (PD0–PD1) will go through two terminating resistors (typical 100–200 ohm) 33 which act as filters to isolate address interference from CPU operation during memory hidden refresh cycles. The two output parity data (PD0–PD1) will then go to the parity bit checker 22 of the computer system 10 in FIG. 1 for parity checking.

Figure 4:
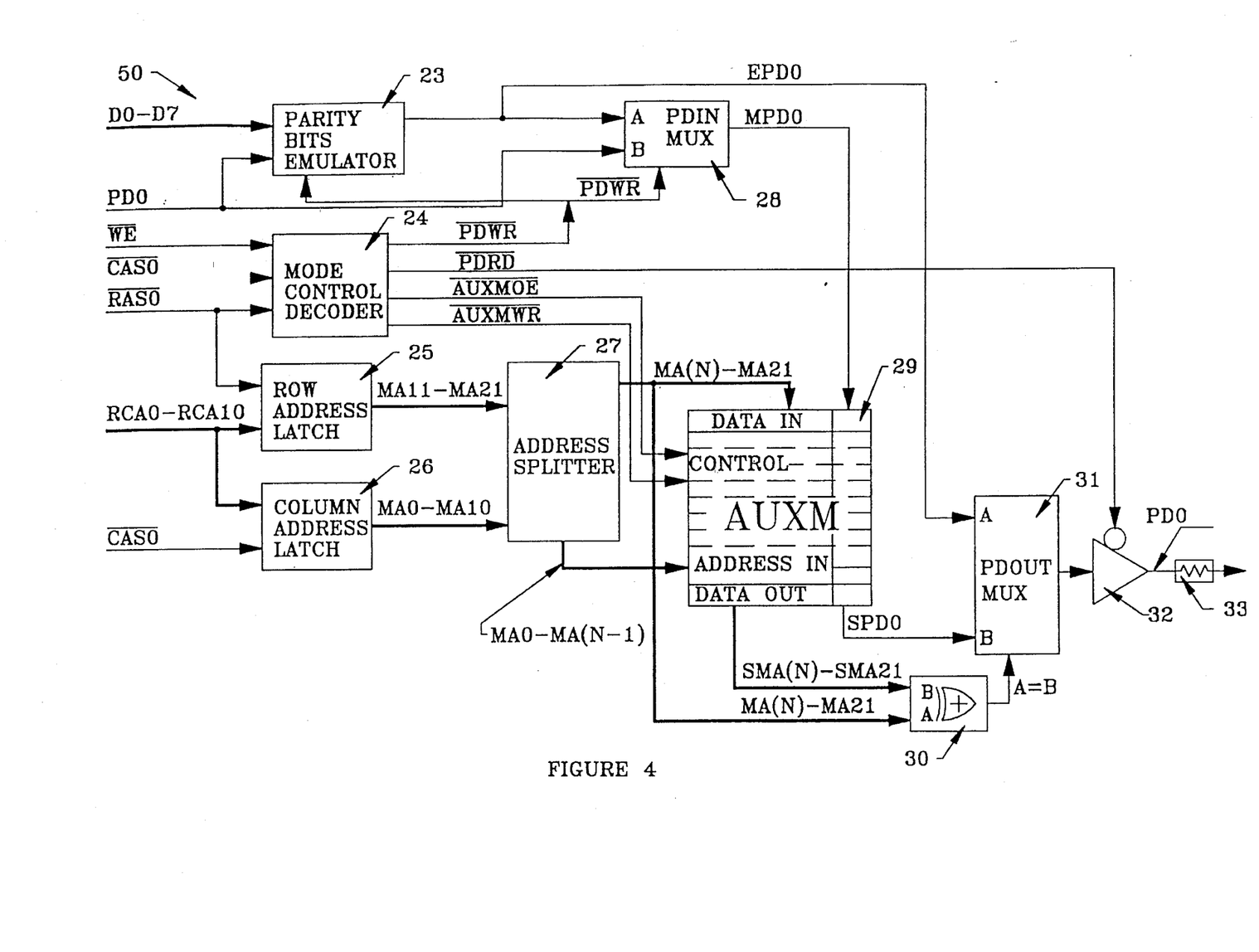
FIG. 4 is a detailed block diagram of an 8 bit CMAP apparatus according to the present invention, which is capable of performing eight bit memory data integrity checking by storing and retrieving one parity data bit corresponding to the incoming memory address.

FIG. 4 shows an 8 bit version of a CMAP apparatus 50 according to the present invention, wherein eight data bits (D0–D7) and one parity data bit (PD0) are inputted to the parity bits emulator 23. One RAS ($\overline{RAS0}$), one CAS ($\overline{CAS0}$) and eleven bit RAS/CAS multiplexed address (RCA0–RCA10) signals are inputted to row and column address latches 25, 26. The operation of the apparatus 50 is identical to the 32 bit CMAP 20 in FIG. 2, except only one parity data bit (PD0) corresponding to the incoming memory address is stored in the AUXM 29. Address comparator 30 compares both stored memory address (SMA(N)–SMA21) and latched memory address (MA(N)–MA21) to determine if a match has occured. If a match occurs, the parity data output multiplexer (PDOUTMUX) 31 selects the stored parity data (SPD0) from AUXM 29, otherwise it selects the emulated parity data bit (EPD0) from parity bits emulator 23. Finally, tristate buffer 32 enabled by parity data read ($\overline{PDRD}$) signal will output the selected parity data bit (PD0). Parity data bit (PD0) will go through the terminating resistor (typical 100–200 ohm) 33 which act as a filter to isolate address interference from CPU operation during memory hidden refresh cycles. The output parity data (PD0) will then go to the parity bit checker 22 of the computer system 10 in FIG. 1 for parity checking.

Figure 5:
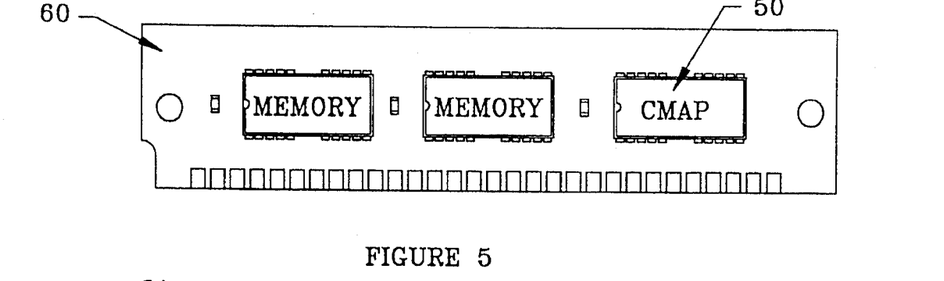
FIG. 5 is a side view of a 30 pin SIMM memory module of 8 bit data words with one 8 bit CMAP apparatus according to the present invention.

FIG. 5 shows the 8 bit CMAP apparatus 50 of FIG. 4 in a 30 pin SIMM memory module 60. In this case only eight bidirectional data lines (D0–D7) and one bidirectional parity data line (PD0) are used. The 8 bit CMAP apparatus 50 is a cost effective apparatus to use in a 30 pin SIMM memory module.

Figure 6:
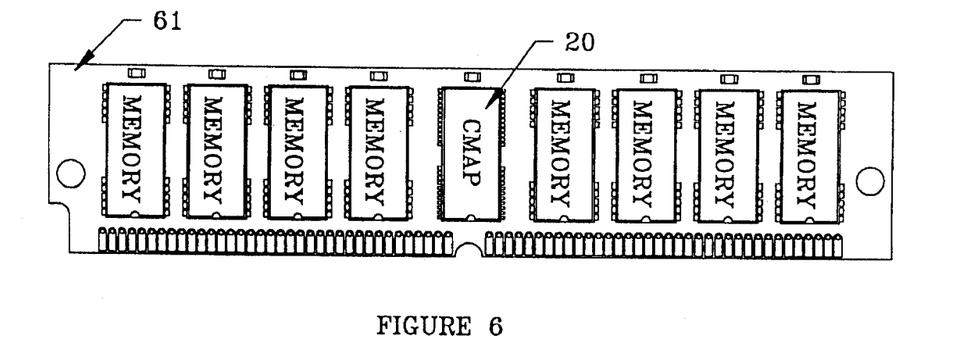
FIG. 6 is a side view of a 72 pin SIMM memory modules of 32 bit data words with one 32 bit CMAP apparatus according to the present invention.

FIG. 6 shows the 32 bit CMAP apparatus 20 of FIG. 2 in a 72 pin SIMM memory module 61. In this case, all 32 bit bidirectional data lines (D0–D7, D8–D15, D16–D23, D24–D31) and all 4 bidirectional parity data lines (PD0–PD3) are used. The 32 bit CMAP apparatus 20 is capable of working with a 32 bit data memory and 4 bit parity bits. This makes the 32 bit CMAP apparatus 20 an ideal replacement for 4 memory parity chips in a 72 pin SIMM memory module.

Figure 7:
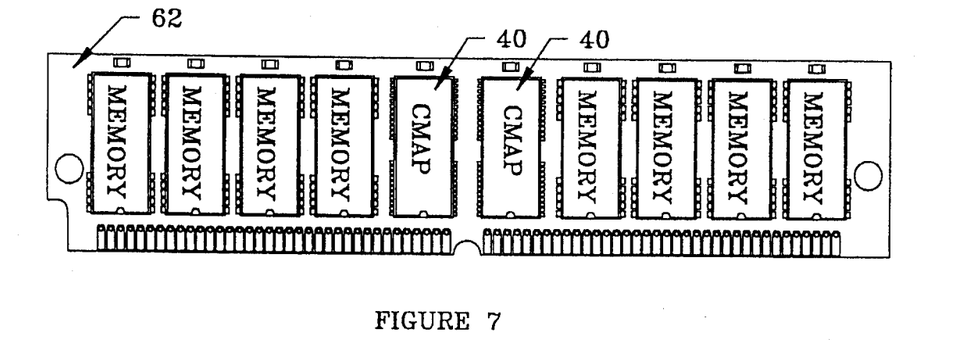
FIG. 7 is a side view of a 72 pin SIMM memory modules of 32 bit data words with two 16 bit CMAP apparatuses according to the present invention.

FIG. 7 shows two 16 bit CMAP apparatuses 40 in a 72 pin SIMM memory module 62. Two 16 bit CMAP apparatuses 40 are required to work with a 32 bit data memory and 4 bit parity. The advantage of using two 16 bit CMAP apparatus in this case is smaller component size than one 32 bit CMAP apparatus.

Figure 8:
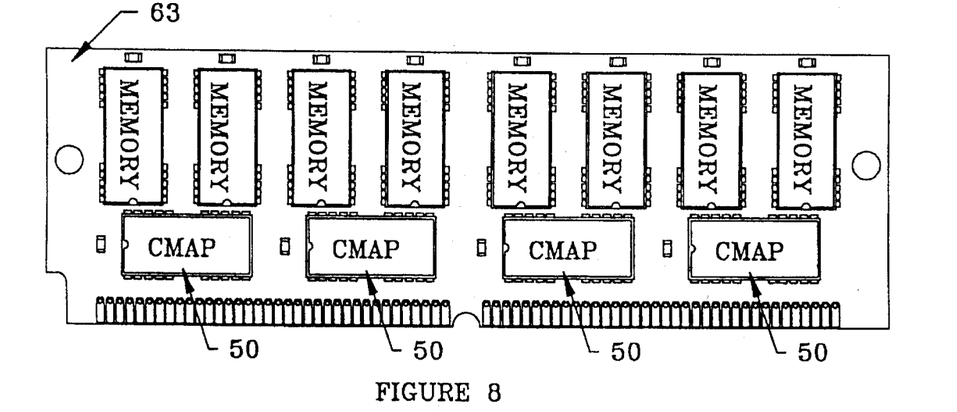
FIG. 8 is a side view of a 72 pin SIMM memory modules of 32 bit data words with four 8 bit CMAP apparatuses according to the present invention.

FIG. 8 shows four 8 bit CMAP apparatuses 50 in a 72 pin SIMM memory module. Four 8 bit CMAP apparatuses are required to work with a 32 bit data memory and 4 bit parity. The advantage of using four 8 bit CMAP apparatuses in this case is for inventory control. As will be noted, both 30 pin and 72 pin SIMM memory modules can use the same kind of 8 bit CMAP apparatus.

Figure 9:
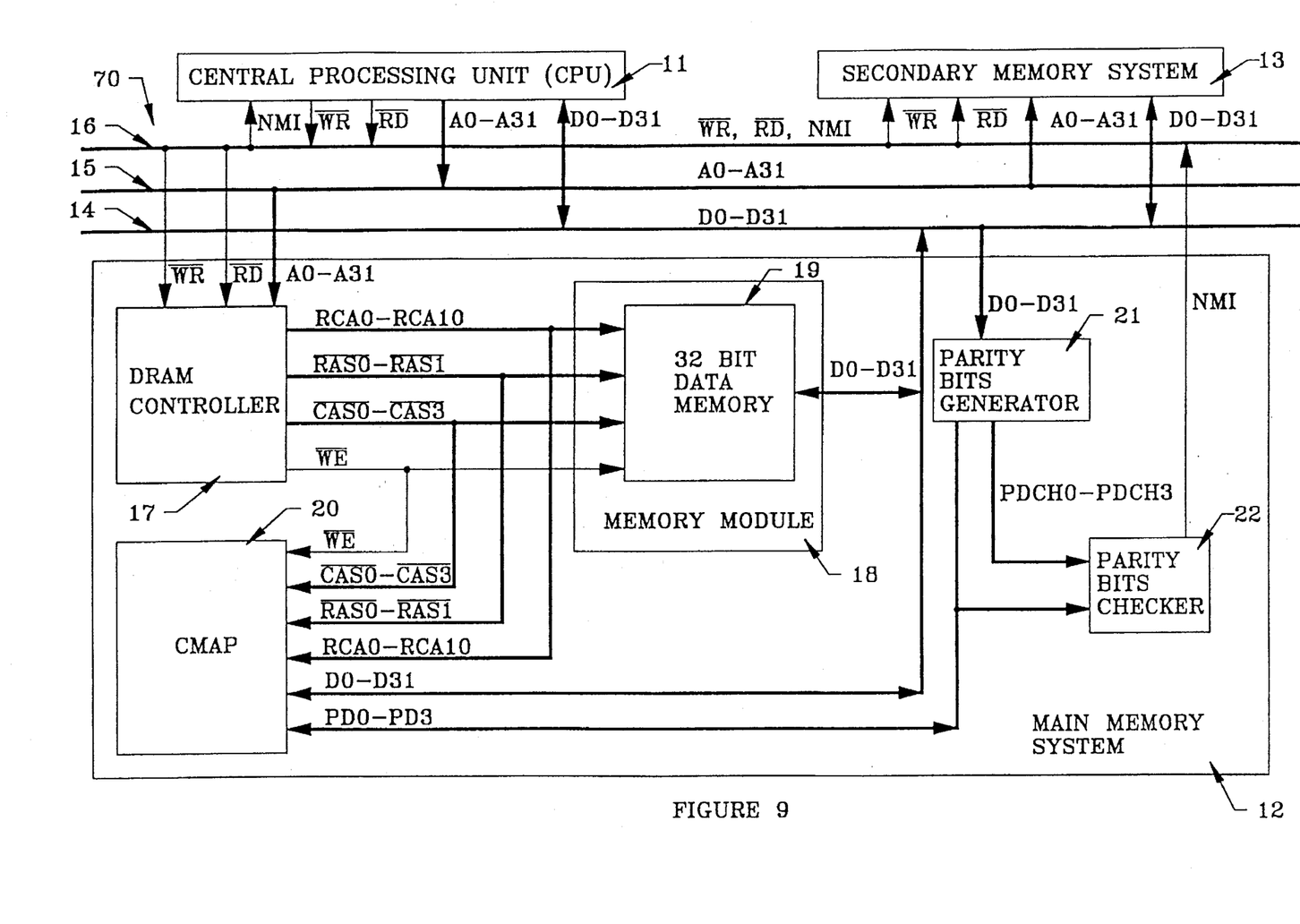
FIG. 9 is a block diagram of a 32 bit CMAP apparatus integrated in a chipset of a typical personal computer system according to the present invention.

FIG. 9 shows a block diagram of a computer system 70 integrated with a 32 bit CMAP apparatus 20 in the system logic design. In this case, the memory modules used can be of memory data only without memory parity. This approach allows tremendous saving in memory parity overhead cost because the chipset that works with the CPU can be integrated easily with the 32 bit CMAP apparatus. For example, all the memory modules used in an IBM personal computer and an Apple Macintosh can be of the same kind while still maintaining memory parity checking capability.

The CMAP apparatus 20, 40 and 50 of FIGS. 2–4 is also suitable for use inside of a central processing unit. Heretofore, due to limited memory space and power handling capabilities, parity checking has not been implemented in on chip cache memory systems. Now, however, with the CMAP apparatus of the present invention the reliability of microprocessor operation and data integrity can be enhanced without drastically increasing space and energy consumption.

Figure 10:
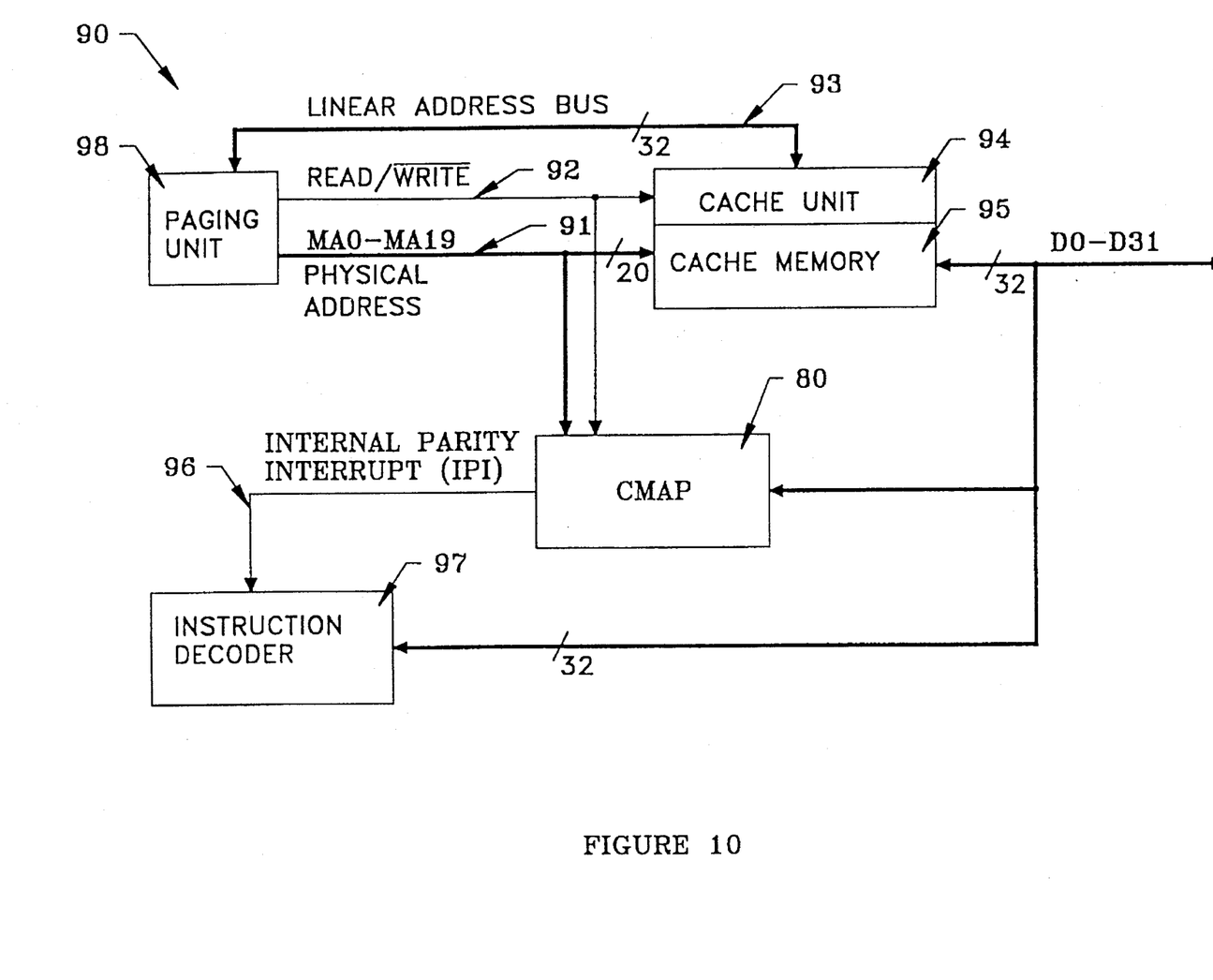
FIG. 10 is a block diagram of a portion of a 32 bit microprocessor with a cache memory and a modified CMAP apparatus according to another embodiment of the present invention.

Referring to FIG. 10, there is provided a portion of a 32 bit microprocessor apparatus designated generally as 90 comprising a CMAP apparatus 80 in accordance with another embodiment of the present invention. The CMAP apparatus 80 is coupled to a paging unit 98 by means of a physical address bus 91 and a control signal bus 92 which also supply signals to a cache unit 94 and a cache memory 95, respectively, to monitor the integrity of data stored in the cache memory 95. As will be described below, in the case of a data corruption, the CMAP apparatus 80 will issue an internal parity interrupt (IPI) signal on a line 96 to an instruction decoder 97.

Figure 11:
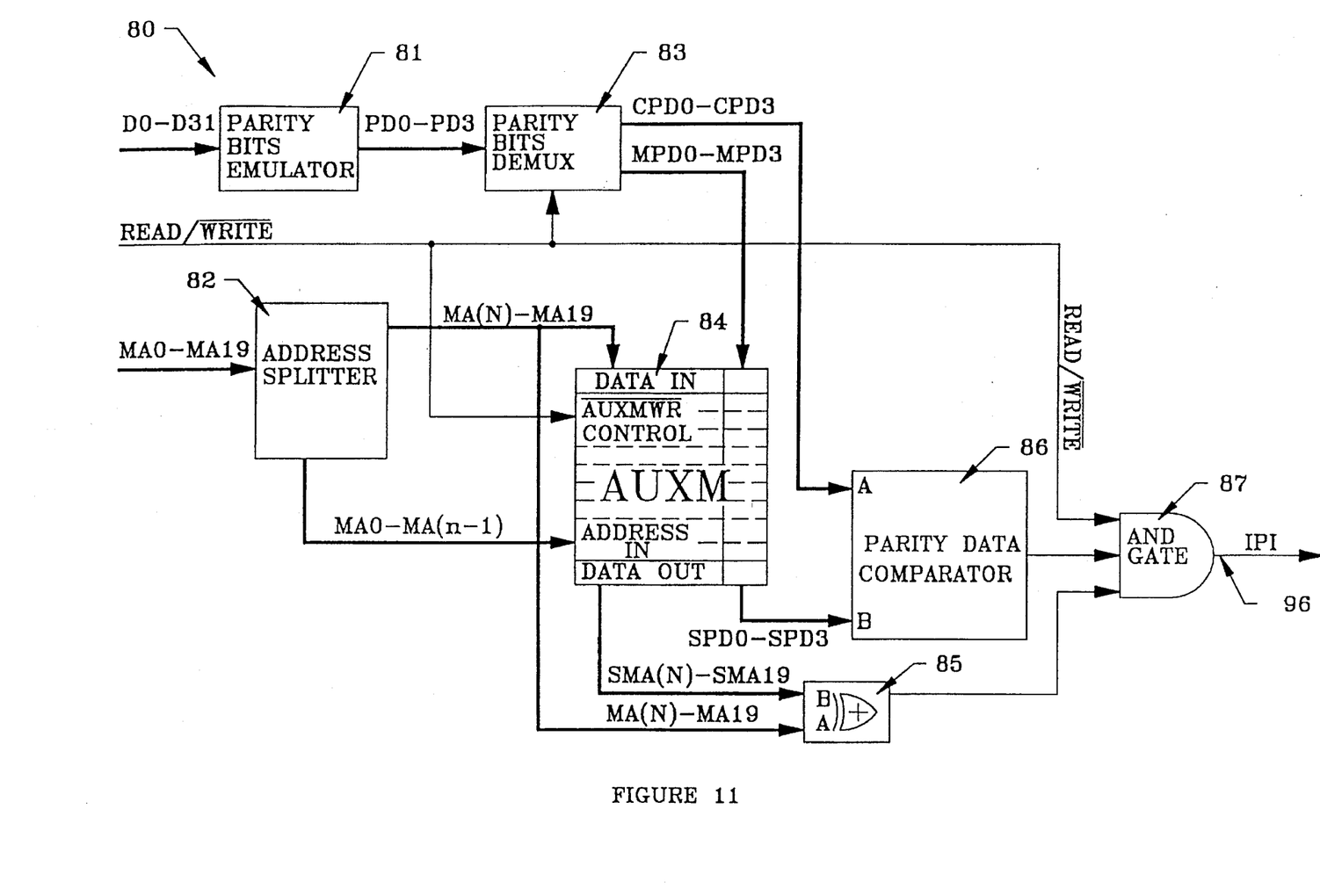
FIG. 11 is a detailed block diagram of the CMAP apparatus of FIG. 10.

Referring to FIG. 11, in operation during a write cycle, 32 bits of data D0–D31 are applied to a parity bits emulator 81 resulting in parity bits signal PD0–PD3. The concurrent presence of a write signal $\overline{\text{WRITE}}$ applied to parity bits demultiplexer 83 will redirect the PD0–PD3 signals into MPD0–MPD3 and apply them to an AUXM 84. Concurrently, the M bit address MA0–MA19 at which the data is stored in the cache/data memory 95 is also applied to an address splitter 82 and split into an address part MA0–MA(N–1) and a data part MA(N)–MA19. The data bits MA(N)–MA19 and the parity bits MPD0–MPD3 are stored in the AUXM 84 at the address selected by MA0–MA(N–1). The write signal $\overline{\text{WRITE}}$ which is also applied to an AND gate 87 disables the output from the CMAP apparatus 80 during the write cycle.

During a read cycle data applied to the parity bits emulator 81 will generate corresponding parity signals PD0–PD3. These parity signals are passed to the parity bits demultiplexer (DEMUX) 83 and, in the absence of a write signal $\overline{\text{WRITE}}$, are fed into the parity data comparator 86 in the form of CPD0–CPD3 signals. At the same time, the address signal MA0–MA19 applied to address splitter 82 is split into the address part MA0–MA(N–1) and the data part MA(N)–MA19 and applied to AUXM 84 and an address comparator 85, respectively. Parity bits SPD0–SPD3 at the address selected by signal MA0–MA(N–1) are fed into parity data comparator 86 and compared with signal CPD0–CPD3 resulting in an internal parity interrupt signal in the absence of a data match. Concurrently with the parity data comparison, address signal MA(N)–MA19 from the address splitter 82 is compared with the address signal SMA(N)–SMA19 from AUXM 84. If there is an address match, the signal from the address comparator 85 and the read signal will enable the signal through AND gate 87 and the result of the parity comparison will appear on the output of the CMAP apparatus on the line 96. In the case of a mismatch, the output of the comparator 85 disables the AND gate 87.

While preferred embodiments of the present invention are described above, it is contemplated that modifications may be made thereto for particular applications without departing from the spirit and scope of the present invention. For example, the CMAP apparatus of the present invention as used in a memory module as shown in FIGS. 1–8 can also be put directly in a memory chip. In the memory chip, the CMAP apparatus has the same inputs and outputs as shown in FIG. 1. Accordingly, it is intended that the embodiments described be considered only as illustrative of the present invention and that the scope thereof should not be limited thereto but be determined by reference to the claims hereinafter provided.

What is claimed is:

1. For use in a digital apparatus having a data memory, means for storing data in the data memory at a data memory address and means for reading data from a data memory address in said data memory, each said data memory address having M bits, a parity checking apparatus comprising:

an auxiliary memory having $2^N$ addresses;

means for addressing the auxiliary memory with an address defined by a predetermined number N of the least significant bits of the M bit address in the data memory at which data is stored;

means for generating a parity bit for each predetermined set of data bits stored in the data memory;

means for storing in said auxiliary memory at an address defined by a predetermined number N of the least significant bits of the M bit address in the data memory at which data is stored the M–N most significant bits of the address in the data memory at which data is stored together with the parity bits generated when said data is stored in the data memory;

means for comparing the M–N address bits stored in the auxiliary memory at the address defined by the N least significant bits of the address in the data memory from which data is read with the M–N most significant bits of the address in the data memory from which data is read;

means responsive to the comparing means for providing the parity bits stored in the auxiliary memory at the address defined by the N least significant bits of the address in the data memory from which the data is read if there is a match;

means for generating a parity bit for each predetermined set of data bits read from the data memory; and means responsive to the comparing means for providing the parity bits generated for each predetermined set of data bits read from the data memory if there is no match.

2. A parity checking apparatus according to claim 1 comprising:

means for storing in the auxiliary memory at the address defined by the N least significant bits of the address in the data memory of the data most recently read from the data memory the M–N most significant bits of the address in the data memory of the data most recently read from the data memory together with the parity bits generated for each predetermined set of data bits most recently read from the data memory if there is no match.

3. A parity checking apparatus according to claim 1 wherein said parity checking apparatus is located on a data memory chip.

4. A parity checking apparatus according to claim 1 wherein said parity checking apparatus is located in a chip set separate and apart from a data memory module.

5. A parity checking apparatus according to claim 1 wherein said auxiliary memory comprises at least one of an SRAM, a DRAM, an EEPROM, a FLASH RAM and an array of flip-flops with a tristate output.

6. A parity checking apparatus according to claim 1 wherein said means for generating a parity bit comprises means for automatically generating either odd or even parity according to a previous captured parity format.

7. A parity checking apparatus according to claim 1 wherein said parity checking apparatus is located on a data memory module.

8. A parity checking apparatus according to claim 7 wherein said parity checking apparatus comprises one eight bit parity checking apparatus and said data memory module comprises a thirty pin, eight bit single or double-inline memory module.

9. A parity checking apparatus according to claim 7 wherein said parity checking apparatus comprises one thirty-two bit parity checking apparatus and said data memory module comprises a seventy-two pin, thirty-two bit single or double-inline memory module.

10. A parity checking apparatus according to claim 7 wherein said parity checking apparatus comprises two sixteen bit parity checking apparatuses and said data memory module comprises a seventy-two pin, thirty-two bit single or double-inline memory module.

11. A parity checking apparatus according to claim 7 wherein said parity checking apparatus comprises four eight bit parity checking apparatuses and said data memory module comprises a seventy-two pin, thirty-two bit single or double-inline memory module.

12. For use in a digital apparatus having a data memory, means for storing data in the data memory at a data memory address having M bits, and means for reading data from an address having M bits in the data memory, a method of checking parity comprising the steps of:

generating a parity bit for each predetermined set of data bits stored in the data memory;

storing in an auxiliary memory at an address defined by a predetermined number N of the least significant bits of the M bit address in the data memory at which data is stored the M–N most significant bits of the address in the data memory at which data is stored together with the parity bits generated when said data is stored in the data memory;

comparing the M–N address bits stored in the auxiliary memory at the address defined by the N least significant bits of the address in the data memory from which data is read with the M–N most significant bits of the address in the data memory from which data is read;

providing the parity bits stored in the auxiliary memory at the address defined by the N least significant bits of the address in the data memory from which the data is read if there is a match;

generating a parity bit for each predetermined set of data bits read from the data memory; and providing the parity bits generated for each predetermined set of data bits read from the data memory if there is no match.

13. A method according to claim 12 comprising the steps of:

storing in the auxiliary memory at the address defined by the N least significant bits of the address in the data memory of the data most recently read from the data memory the M–N most significant bits of the address in the data memory of the data most recently read from the data memory together with the parity bits generated for each predetermined set of data bits most recently read from the data memory if there is no match.

14. A method of checking the parity of data stored in and read from an address having M bits in a data memory comprising the steps of:

storing in an auxiliary memory a predetermined number M–N of the most significant bits of the data memory address at which data is stored in the data memory together with one or more parity bits which are generated when the data is stored in the data memory at said data memory address at an address in the auxiliary memory defined by the N least significant bits of said data memory address;

reading the contents stored at the address in the auxiliary memory defined by the N least significant bits of a data memory address from which data is being read from said data memory, said contents comprising the M–N most significant bits of a data memory address and one or more parity bits;

comparing the M–N most significant bits of the data memory address read from the auxiliary memory with the M–N most significant bits of the data memory address of data being read from the data memory;

providing the one or more parity bits stored with the M–N most significant bits of the data memory address being read from the auxiliary memory if there is a match; and providing one or more parity bits which are generated when the data is read from the data memory if there is no match.

15. A method according to claim 14 comprising the step of storing in the auxiliary memory at the address defined by the N least significant bits of the most recently read data memory address for which a mismatch occurred the M–N most significant bits of the data memory address for which the mismatch occurred and the parity bit for the date stored thereat.

16. For use in a digital apparatus having a data memory, means for storing data in the data memory at a data memory address having M bits, and means for reading data from an address having M bits in the data memory, a parity checking apparatus comprising:

means for generating a parity bit for each predetermined set of data bits stored in the data memory;

means for storing in an auxiliary memory at an address defined by a predetermined number N of the least significant bits of the M bit address in the data memory at which data is stored the M–N most significant bits of the address in the data memory at which data is stored together with the parity bits generated when said data is stored in the data memory;

first means for comparing the M–N address bits stored in the auxiliary memory at the address defined by the N least significant bits of the address in the data memory from which data is read with the M–N most significant bits of the address in the data memory from which data is read;

means for disabling the output of the parity checking apparatus an internal parity interrupt signal if the output of said first comparing means indicates that there is no match;

means for generating a parity bit for each predetermined set of data bits read from the data memory;

second means for comparing the parity bits stored in the auxiliary memory at the address defined by the N least significant bits of the address in the data memory from which data is read with the parity bits generated when the data is read from the data memory; and means for generating an internal parity interrupt signal if the output of said second comparing means indicates that there is no match.

17. An apparatus according to claim 16 comprising:

means for storing in the auxiliary memory at the address defined by the N least significant bits of the address in the data memory of the data most recently read from the data memory the M–N most significant bits of the address in the data memory of the data most recently read from the data memory together with the parity bits generated for each predetermined set of data bits most recently read from the data memory if there is no match.

* * * * *